(12) United States Patent
Yui

(10) Patent No.: US 6,961,097 B2
(45) Date of Patent: Nov. 1, 2005

(54) IMAGE PROCESSING APPARATUS

(75) Inventor: Hideaki Yui, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 3 days.

(21) Appl. No.: 10/916,401

(22) Filed: Aug. 12, 2004

(65) Prior Publication Data
US 2005/0012863 A1 Jan. 20, 2005

Related U.S. Application Data

(62) Division of application No. 09/790,599, filed on Feb. 23, 2001, now Pat. No. 6,859,236.

(30) Foreign Application Priority Data

Feb. 29, 2000 (JP) .............................. 2000-052992

(51) Int. Cl.[7] .......................... H04N 5/262; H04N 9/75
(52) U.S. Cl. .................... 348/584; 348/588; 348/587; 348/592; 348/564; 348/565; 382/284; 345/630
(58) Field of Search ................................ 348/592, 584, 348/585, 587, 590, 591, 578, 588, 552, 555, 348/564, 565, 598; 382/284, 283, 282; 345/630, 345/629, 619, 581; 358/540, 450

(56) References Cited

U.S. PATENT DOCUMENTS

| | | | |
|---|---|---|---|
| 4,621,280 A | 11/1986 | Shinohara et al. | 348/587 |
| 5,566,251 A | 10/1996 | Hanna et al. | 382/284 |
| 5,594,850 A | 1/1997 | Noyama et al. | 345/632 |
| 5,630,105 A | 5/1997 | Itagaki | 345/501 |
| 5,737,031 A | 4/1998 | Tzidon et al. | 348/587 |
| 5,815,135 A | 9/1998 | Yui et al. | 345/97 |
| 5,900,916 A | 5/1999 | Pauley | 725/59 |
| 5,914,748 A | 6/1999 | Parulski et al. | 348/239 |
| 5,969,767 A | 10/1999 | Ishikawa et al. | 348/564 |
| 5,982,951 A | 11/1999 | Katayama et al. | 382/284 |
| 6,167,158 A | 12/2000 | Boon | 382/238 |
| 6,271,890 B1 | 8/2001 | Tamir et al. | 348/587 |
| 6,473,088 B1 | 10/2002 | Matsumoto et al. | 345/530 |
| 6,493,008 B1 | 12/2002 | Yui | 345/840 |
| 6,522,787 B1 | 2/2003 | Kumar et al. | 382/268 |
| 6,538,675 B2 | 3/2003 | Aratani et al. | 345/856 |
| 6,707,505 B2 * | 3/2004 | Kuo et al. | 348/584 |
| 6,750,919 B1 * | 6/2004 | Rosser | 348/584 |
| 6,822,694 B2 * | 11/2004 | Miyazaki et al. | 348/584 |

FOREIGN PATENT DOCUMENTS

JP  5-316425  11/1993

* cited by examiner

Primary Examiner—John Miller
Assistant Examiner—Jean W. Désir
(74) Attorney, Agent, or Firm—Fitzpatrick, Cella, Harper & Scinto

(57) ABSTRACT

In an apparatus for composing image data of a main picture and image data of a sub-picture by a chroma key process, an attribute of an image contained in the sub-picture is detected, a partial area of the sub-picture is set as a chroma key mask area in accordance with the attribute detection result, and composing the image data of the main picture and the image data of the sub-picture by executing the chroma key process for an area other than the chroma key mask area without executing the chroma key process for the chroma key mask area in the sub-picture.

7 Claims, 14 Drawing Sheets

IMAGE PROCESSING APPARATUS

This application is a divisional of application Ser. No. 09/790,599, filed Feb. 23, 2001, now U.S. Pat. No. 6,859,236.

BACKGROUND OF THE INVENTION

1. Field of the Invention

The present invention relates to an image processing apparatus, and more particularly to techniques of composing image signals of a plurality of images in one picture.

2. Related Background Art

Multi-picture display is now frequently adopted by using a liquid crystal projector or a large display device such as a plasma display device. In the multi-picture display, images received from a DTV (digital television), images reproduced from a DVD (digital versatile disc), and images processed by a personal computer are used. It is thought that a large screen display device will become a main display device for multimedia in home use, and applications to integrally displaying images of various media on one display device has been desired.

In such a background, an image display system directed to applications mainly to DVD is required to have not only a function of displaying a plurality of images at the same time but also a function of composing a plurality of images into one multi-picture. Such images include an image from digital broadcasting, an image from a WWW browser, an image from an e-mail, an image from EPG (electronic program guide), a so-called GUI image such as a user support image of peripheral apparatus compatible with an IEEE1394 serial bus.

In order to realize such functions, a memory is necessary which is used for developing a plurality of input video images and GUI images. This memory has a structure constituted of a video image plane, a GUI image plane, and an alpha plane used for controlling the composition of video images and GUI images. In accordance with alpha values written in the alpha plane, a video image selection, a GUI image selection, and a composition of video and GUI images such as alpha blending can be processed on a bit basis.

In such a conventional image display system, if the memory for developing a plurality of input video and GUI images uses a dedicated alpha plane for controlling the composition of these images, the capacity of alpha plane is generally 8 bits per pixel multiplied by a display resolution.

For example, use of a progressive display device of a high resolution of 1080 P for HDTV of DTV field requires an alpha plane memory having a capacity of 1920×1080×8=2 MB. This increase in the memory capacity may cause an increased load of a CPU which develops alpha values to GUI images or of a graphic accelerator.

In order to solve this problem, a chroma key method has been proposed. With this method, without using an alpha plane, a plurality of input video and GUI images can be composed by inserting a specific key color in GUI image data.

The chroma key composition method relies upon that a CPU can control colors of a GUI image so as not to hit a key color. If data unable to be controlled by CPU is developed in a GUI image, a probability of a key color hit increases and an intended image composition may not be performed. Such the data unable to be controlled by CPU includes still image data derived from BS digital data broadcast, image data on the Internet, natural image data taken by a digital camera or the like.

SUMMARY OF THE INVENTION

It is an object of the invention to solve the above-described problem.

It is another object of the present invention to compose a main picture and a sub-picture at a high precision by efficiently using a memory.

In order to achieve the above objects, one aspect of the invention provides an apparatus for composing image data of a main picture and image data of a sub-picture by a chroma key process, comprising: attribute detecting means for detecting an attribute of an image contained in the sub-picture; area setting means for setting a partial area of the sub-picture as a chroma key mask area in accordance with an output from the attribute detecting means; and composing means for composing the image data of the main picture and the image data of the sub-picture by executing the chroma key process for an area other than the chroma key mask area without executing the chroma key process for the chroma key mask area in the sub-picture.

Other objects and features of the present invention will become apparent from the following detailed description of embodiments when read in conjunction with the accompanying drawings.

DETAILED DESCRIPTION OF THE PREFERRED EMBODIMENTS

Embodiments of the invention will be described with reference to the accompanying drawings.

Figure 1:
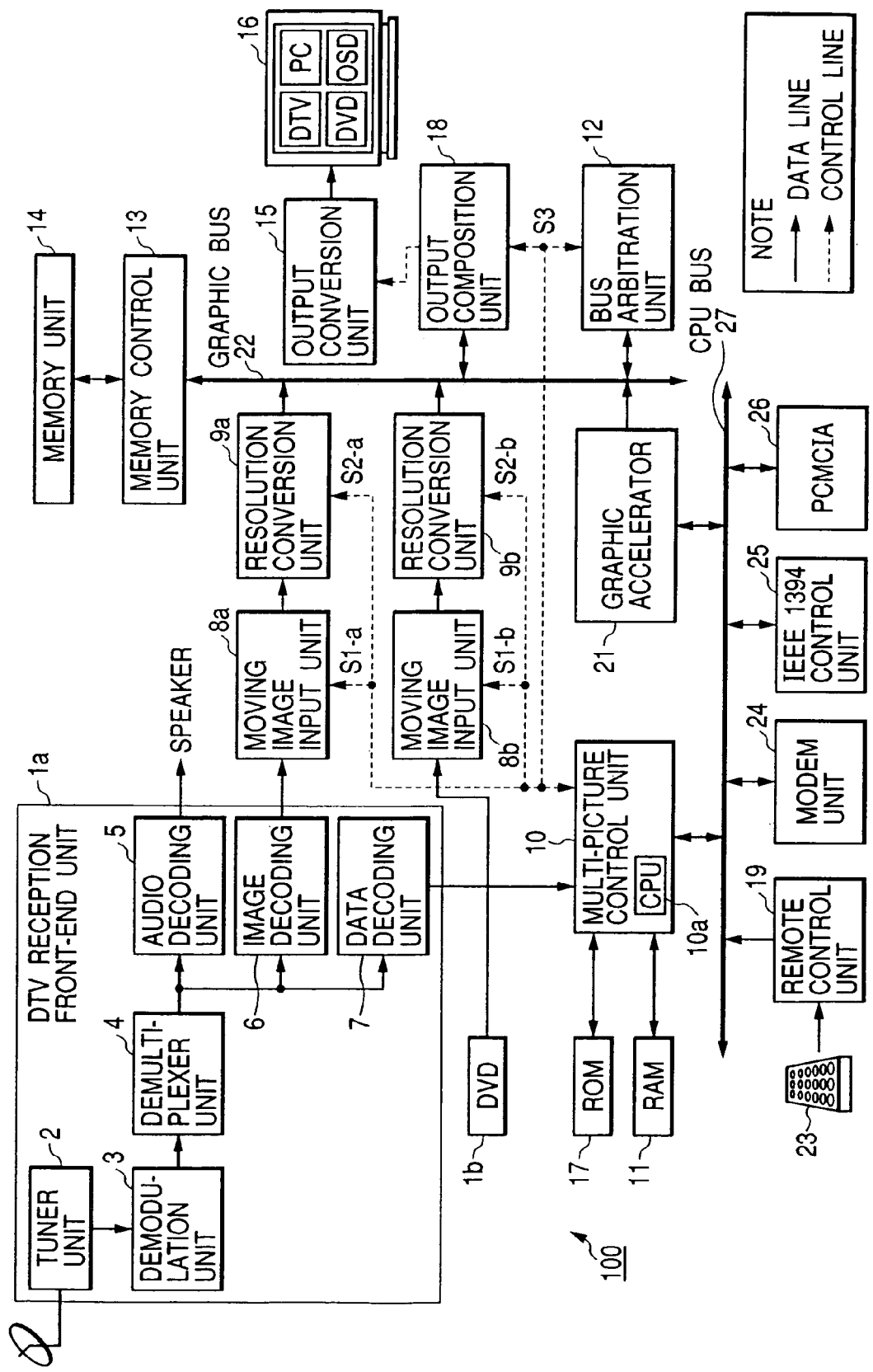
FIG. 1 is a block diagram showing the structure of an image display system according to a first embodiment of the invention.

The present invention is applied, for example, to an image display system 100 shown in FIG. 1. This image display system 100 has a function of composing a plurality of video images and GUI images and integrally displaying them as one picture by a chroma key composition method.

The image display system 100 has an identifying unit for identifying a data type and attribute of an image having a color unable to be controlled by a CPU for controlling a graphic accelerator when the image is developed in a display memory. If the image identified by the identifying unit is judged that it has a high probability of hitting a key color during the chroma key composition process, the chroma key composition process is masked in this image area. In this manner, the memory capacity can be reduced and a precision of the chroma key composition process can be improved.

Structure of Image Display System 100

In this embodiment, it is assumed that the image display system 100 displays images from two dependent image sources as one picture. However, the number of image sources to be displayed on a display monitor is not limited only to two, but the number may be smaller or larger than two.

Referring to FIG. 1, a DTV reception front-end unit (hereinafter called an "image source") 1*a* includes a tuner unit 2, a demodulation unit 3, a demultiplexer unit 4, an audio decoding unit 5, an image decoding unit 6, and a data decoding unit 7.

The tuner unit 2 receives a broadcast signal (digital television signal) from a ground wave, a satellite wave or the like, passes the received signal through a band-pass filter, a down-converter and the like, and thereafter supplies it to the demodulation unit 3. The broadcast signal contains a plurality of multiplexed broadcast program data constituted of moving image data, audio data, addition information data and the like. The demodulation unit 3 demodulates the signal supplied from the tuner unit 2 in a manner matching a transmission type, performs an error correction process and the like, and supplies the processed signal to the demultiplexer unit 4 as a MPEG2 transport stream.

The demultiplexer unit 4 separates the transport stream supplied from the demodulation unit 3 into MPEG2 video data, MPEG2 audio data and addition information of a desired program. The audio decoding unit 5 decodes the MPEG2 audio data supplied from the demultiplexer unit 4 and outputs an audio signal. By connecting an amplifier and a speaker to the output of the audio decoding unit 5, sounds of the broadcast signal (program) received by the tuner unit 2 can therefore be listened.

The image decoding unit 6 decodes the MPEG2 video data supplied from the demultiplexer unit 4 to convert it into image data whose display format is a raster scan type and supply it to a moving image input unit 8*a*.

The data decoding unit 7 decodes the addition information data supplied from the demultiplexer unit 4 and supplies the decoded data to a multi-picture control unit 10.

"Decode" means to derive a scenario of a multimedia information service provider from an object described by a scenario descriptive language, such as, for example, MHEG (Multimedia and Hypermedia Experts Group)-5, HTML (Hyper Text Markup Language) and XML (eXtensible Markup Language) for a BS digital broadcast received at the tuner unit 2.

This scenario is constituted of structural attributes (size, position, image type, coding method) of contents. The multi-picture control unit 10 analyzes a scenario and configures a data broadcast picture in cooperation with a graphic accelerator 21 and the image decoding unit 6. For example, if a CS digital broadcast is received at the tuner unit 2, "decode" means mainly to derive program information. This program information is analyzed by the multi-picture control unit 10 and converted into a GUI picture such as EPG by using a drawing command to the graphic accelerator 21.

A DVD player (hereinafter called an "image source") 1*b* converts an analog composite signal or digital signal into image data of a YUV raster format, and supplies the converted image data to a moving image input unit 8*b*. The moving image input unit 8*a* receives the image data from the image decoding unit 6 of the DTV reception front-end unit 1*a*, whereas the moving input unit 8*b* receives the image data from the DVD player 1*b*.

Although these moving image input units 8*a* and 8*b* have the same structure, they receive image data from the corresponding image sources at independent timings. In this case, the moving image input units 8*a* and 8*b* receive control signals for receiving the image data at the same time in some cases. The control signals include, for example, a horizontal sync signal for synchronization of one line, a vertical sync signal for synchronization of one frame or field, a clock signal for sampling each pixel, a display enable signal representative of a transfer period of effective image data, and the like.

If the received image data is computer analog signals, the moving image input units 8*a* and 8*b* process the received analog signals by using an A/D converter for converting the analog signal into a digital signal and a PLL circuit for sampling image data.

If the received image data is digital signals such as LVDS (Low Voltage Differential Signal), the moving image input units 8*a* and 8*b* process the digital signals by using a decoder and a differential buffer. If the received image data is composite signals, they process the composite signals by using a color conversion circuit for converting YUV into RGB signals and an I-P converter circuit for converting a scan method from am interlace scanning to a progressive scanning.

A resolution conversion unit 9*a* converts a display format (display line number, dot number, color number) of image data received from the moving image unit 8*a*, under the control of the multi-picture control unit 10. Similarly, a resolution conversion unit 9*b* converts a display format of image data received from the moving image unit 8*b*, under the control of the multi-picture control unit 10.

The resolution conversion units 9*a* and 9*b* each have a bus interface function of outputting independent two sets of image data to one common graphic bus 22.

Therefore, the image data output from each of the resolution conversion units 9*a* and 9*b* is stored in a memory via the graphic bus 22, under the control of a memory control unit 13. This memory 14 has a capacity corresponding to at least one picture. In this embodiment, the memory 14 has a capacity corresponding to at least three pictures, for the image data as well as data output from the graphic accelerator 21.

An output composition unit 18 issues a memory address at which image data to be displayed is stored, to the memory control unit 13, in accordance with a multi-window management command from the multi-picture control unit 10. In this manner, display image data is read from the memory unit 14 to realize final multi-picture composition.

In order to display an image corresponding to the image data output from the output composition unit 18, particularly a multi-picture, on a display device 16, an output conversion unit 15 performs synchronously with the frame rate of the display device 16 a display control corresponding to the characteristics of the display device 16 and a display format conversion process.

The display device 16 displays images corresponding to image data output from the output conversion unit 15. The display device 16 may be a flat panel display device (liquid crystal, plasma or the like) having a matrix electrode structure, a CRT or the like so long as it can display an image. In this embodiment, a high definition display device for a television and a large screen display device having a high precision of SXGA or more for a PC are intended.

A bus arbitration unit 12 scalably manages asynchronous accesses from the graphic bus 22 to the memory unit 14, in accordance with a priority order.

The multi-picture control unit 10 controls the whole operation of this system 100 and has a CPU 10a with an arithmetic function, a RAM 11 for temporary data storage, a ROM 17 for storing a control program and the like, a time counter, a peripheral I/O interface and the like.

The multi-picture control unit 10 may be made of only logical circuits or may be a CPU or a media processor capable of parallel calculation. A program to be used for the control by the multi-picture control unit 10 may be written in ROM 17 or may be supplied externally via the peripheral I/O interface.

ROM 17 stores, if necessary, character font data and the like. The font data is used when character information from WWW or data broadcast is developed in an image.

A remote control unit 19 is connected to the multi-picture control unit 10. Therefore, the multi-picture control unit 10 can receive a command (using infrared ray) from a remote controller 23 via the remote control unit 19.

The graphic accelerator 21 operates when the multi-picture control unit 10 uses a drawing command and an acceleration function such as BitBit and DMA to display a GUI image on the display device 16, the GUI image including an OSD (On Screen Display) image, an EPG image, a data broadcast image.

A modem unit 24 operates for connection to the Internet. An IEEE1394 control unit 25 operates for connection to an external apparatus compatible with the IEE1394 serial bus specification. A PCMCIA 26 operates to capture image data taken with a digital camera or the like by using a compact flash card or the like. These peripheral devices are connected via a CPU bus 27 to the multi-picture control unit 10.

Operation of Image Display System 100

Figure 2:
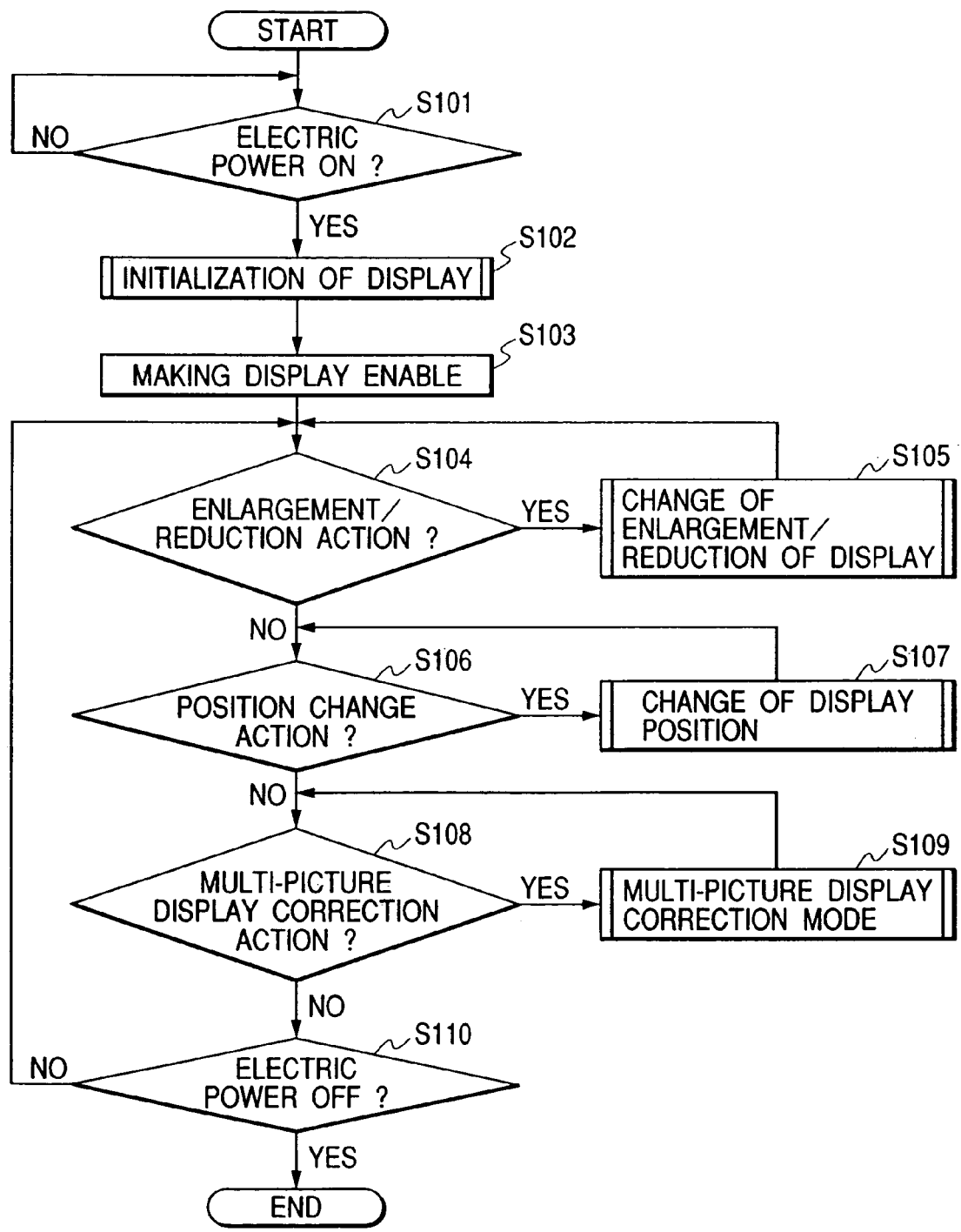
FIG. 2 is a flow chart illustrating a multi-picture display operation of the image display system shown in FIG. 1.

The image display system 100 operates, for example, in accordance with the processes shown in the flow chart of FIG. 2. This operation is realized by CPU in the multi-picture control unit 10.

Step S101, Step S102:

Upon detection of a power-on of the system 100 by the remote controller 23 (Step S101), the multi-picture control unit 10 executes a display initializing process (Step S102). The display initializing process at Step S102 is illustrated in the flow chart of FIG. 3.

Figure 3:
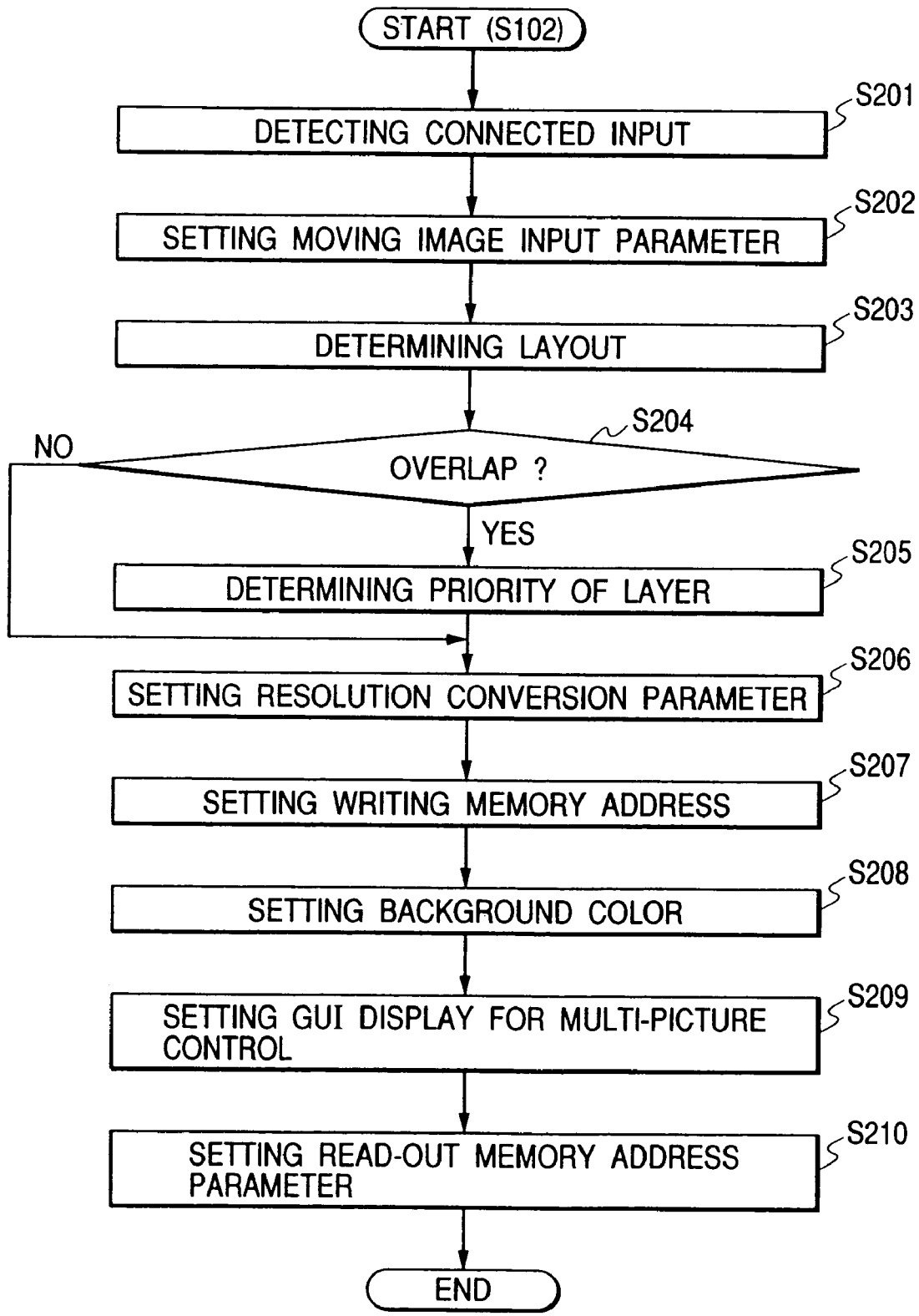
FIG. 3 is a flow chart illustrating an initializing process of the multi-picture display operation.

Referring to FIG. 3, the multi-picture control unit 10 first detects a connected input (Step S201). This process checks how many image sources are connected to the system 100.

More specifically, the moving image input units 8a and 8b always monitor a connection confirmation signal from the corresponding ones of the image sources. This connection confirmation signal is a binary signal of logical "1" or "0"

output from the image sources 1a and 1b. For example, when the connection cable is disconnected or the power source of the image source is turned off, the logic "0" of the connection confirmation signal is output because the moving image input units 8a and 8b are terminated by resistors. It is therefore possible to confirm that the image data is not input from the corresponding image source.

In accordance with monitor information supplied from the moving image input units 8a and 8b via control lines S1-*a* and S1-*b* at a constant time interval, the multi-picture control unit 10 can detect the connection confirmation signal output from the image sources 1a and 1b. If the connection confirmation signal is "1", it is judged that the image source is connected, and thereafter the flow advances to a moving image input parameter setting process at Step S202. If the connection confirmation signal is "0", the connection confirmation signal is monitored until the connection confirmation signal of "1" is input.

After Step S201, in accordance with information supplied from the moving image input units 8a and 8b via the control line S1-*a* and S1-*b*, the multi-picture control unit 10 detects parameters (display dot number, display line number, horizontal/vertical timings, and the like) used for inputting image data from the image source whose connection was detected, and sets the detected parameters to the moving image input units 8a and 8b via the control lines S1-*a* and S1-*b* (Step S202).

These parameters may be obtained by the moving image input units 8a and 8b by directly counting the clock number and horizontal sync signal number by using the horizontal sync signal for line synchronization, a vertical sync signal for frame/field synchronization, a clock signal for sampling a pixel and the like.

Next, the multi-picture control unit 10 determines a display layout to be used when image data from one or more image sources whose connection was detected is displayed on the display device 16 (Step S203). A default layout is preset in advance in ROM 17.

Next, the multi-picture control unit 10 judges whether there is an image overlap in the display layout determined at Step S203 is used (Step S204). If it is judged that there is an image overlap, the flow advances to Step S205 and then to Step S206, whereas if not, the flow directly advances to Step S206.

If it is judged at Step S204 that there is an image overlap, the multi-picture control unit 10 determines a layer priority order of the image overlap (an image on the upper layer has a higher layer priority), and writes this information in RAM 11 (Step S205).

At Step S206, the multi-picture control unit 10 determines display start/end positions and magnification/reduction factors in horizontal/vertical directions of each image on the display device 16, and writes the determined information in RAM 11 as resolution conversion parameters. The multi-picture control unit 10 sets the resolution conversion parameters to the resolution conversion units 9a and 9b via control lines S2-*a* and S2-*b*.

Next, the multi-picture control unit 10 sets write memory addresses necessary for writing the outputs from the resolution conversion units 9a and 9b into the memory unit 14 (Step S207). These memory addresses are used as offset values of memory addresses to be used in a write address generation process.

Figure 4:
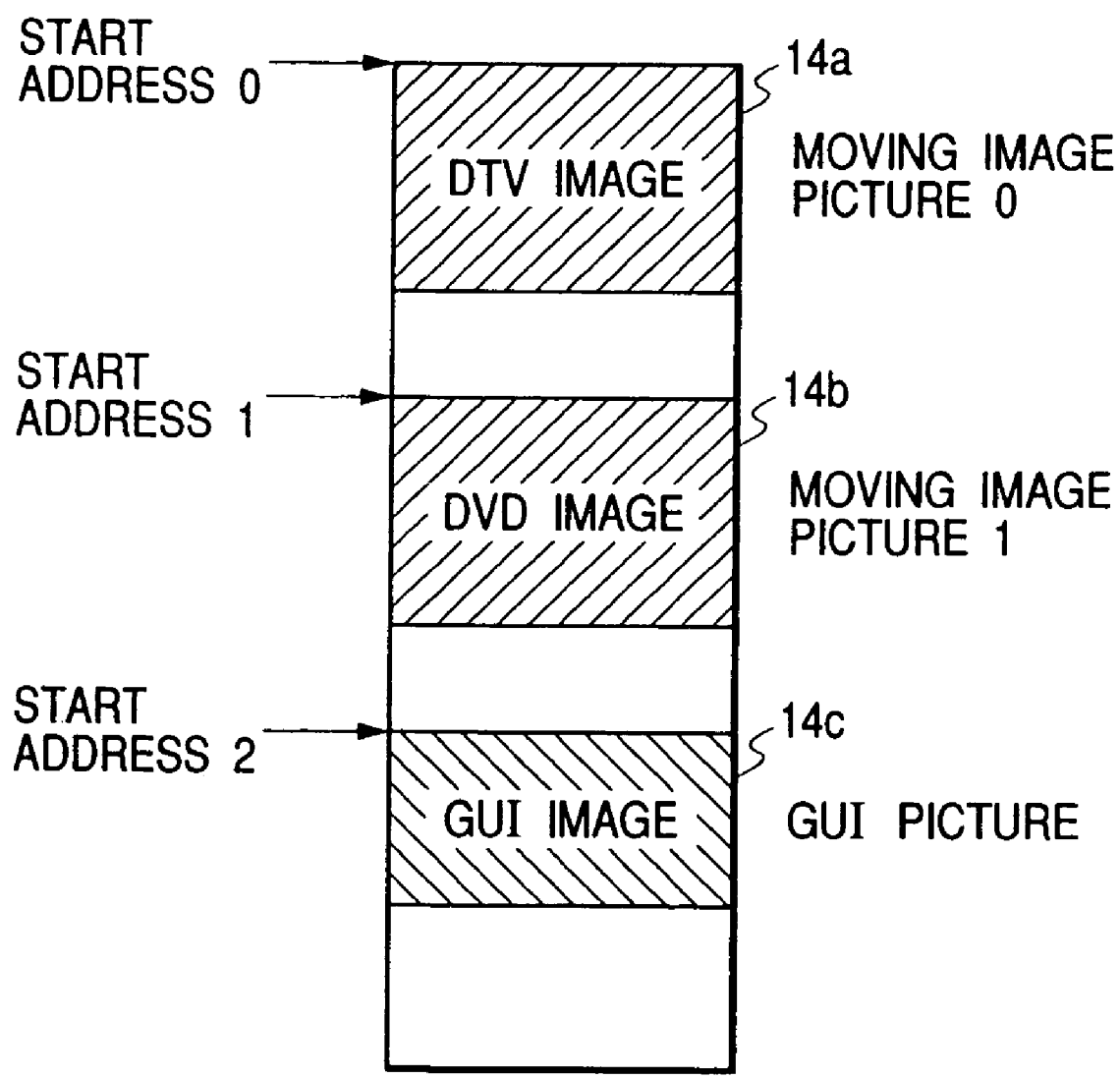
FIG. 4 is a memory address map of a memory unit of the image display system shown in FIG. 1.

In this embodiment, for example, as shown in FIG. 4, the memory unit 14 is constituted of three areas including moving image areas 14a and 14b and a GUI image area 14c. Therefore, at the time when the data is written in the memory unit 14, the memory unit 14 is not in an on-screen state. In this case, the multi-picture control unit 10 sets start addresses 0 to 2 of the areas 14a to 14c to the resolution conversion units 9a and 9b via the control lines S2-a and S2-b and to the graphic accelerator 21.

Figure 5:
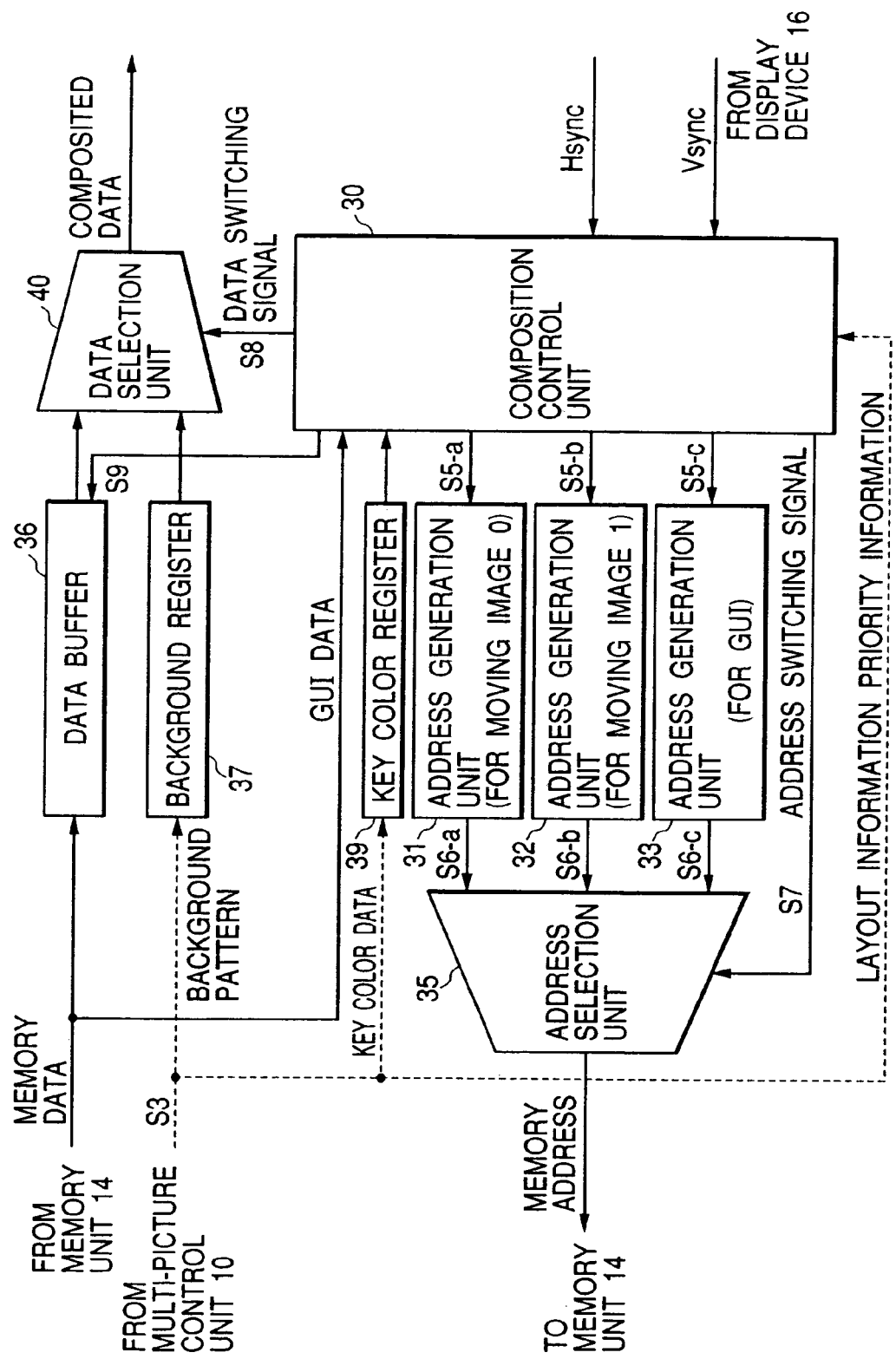
FIG. 5 is a block diagram showing the structure of an output composition unit of the image display system shown in FIG. 1.

Next, the multi-picture control unit 10 sets a background color to be used for the multi-window display of the display device 16 (Step S208). More specifically, the output composition unit 18 has the circuit structure such as shown in FIG. 5. The multi-picture control unit 10 sets the background color to a background register 37 of the output composition unit 18. Next, the multi-picture control unit 10 sets GUI images for the multi-picture control (Step S209).

More specifically, GUI images are used not only as multi-picture control images but also as Web images and EPG images. The multi-picture control unit 10 generates GUI images by issuing a GUI image drawing command to the graphic accelerator 21 or by writing characters and other data developed in a bit map format in the memory unit 14 by using the DMA function of the graphic accelerator 21. The multi-picture control unit 10 also determines the display layout of the GUI images on the multi-picture screen. The priority order in this case is highest.

The multi-picture control unit 10 performs various settings for the operation of the output composition unit 18 (Step S210).

The outline of the output composition 18 which operates in accordance with the settings at Step S210 will be described with reference to FIG. 5.

Referring to FIG. 5, a composition control unit 30 generates various control signals in accordance with a comparison result between parameters to be described later and the counts of a horizontal pixel number counter and a vertical line number counter which counters operate-using sync signals (Hsync, Vsync) of the display device 16 as a reference.

In accordance with a signal S3 supplied from the multi-picture control unit 10, the composition control unit 30 acquires a horizontal count start value (corresponding to a period from Hsync to the start of an effective pixel), a vertical line start value (corresponding to a period from Vsync to the start of an effective line), a horizontal pixel number and a vertical line number to thereby count the number of raster scans during the display period of the display device 16.

In accordance with the signal S3 supplied from the multi-picture control unit 10, the composition control unit 30 acquires for each image, composition start addresses (offset values from the start of an effective count of the composition control unit 30), horizontal pixel numbers and vertical line numbers (information set to address generation units 31 to 33) for the images to be composed, which respectively reflect layout information of each image. The composition control unit 30 compares the acquired information with the count by the composition control unit 30. If these values are coincident, the composition control unit 30 makes via data lines S5-a to S5-c the three address generation units 31 to 33 start counting. The three address generation units 31 to 33 therefore start a count operation independently.

Resetting the counters by the composition control unit 30 is generally effected at each Vsync.

The count outputs from the address generation units 31 to 33 are used as read addresses and output from data lines S6-a to S6-c.

In this embodiment, since different image sources are managed for composing images, these images are selected by changing addresses. Namely, an address selection unit 35 selects an address to realize image composition. This address selection is performed in the following manner. In accordance with the signal S3 supplied from the multi-picture control unit 10, the composition control unit 30 acquires a composition switching count number based upon the layout information and priority information, and compares this count value with the count value of the counter of the composition control unit 30 to generate an address switching signal S7.

Data is then read from the memory unit 14 and written in a data buffer 36 in accordance with a read/write control signal S9. The data in the data buffer 36 is output to a data selection unit 40 in response to the read/write signal S9.

If it is judged that there is no images to be composed, the composition control unit 30 outputs a data switching signal S8 to the data selection unit 40.

Figure 6:
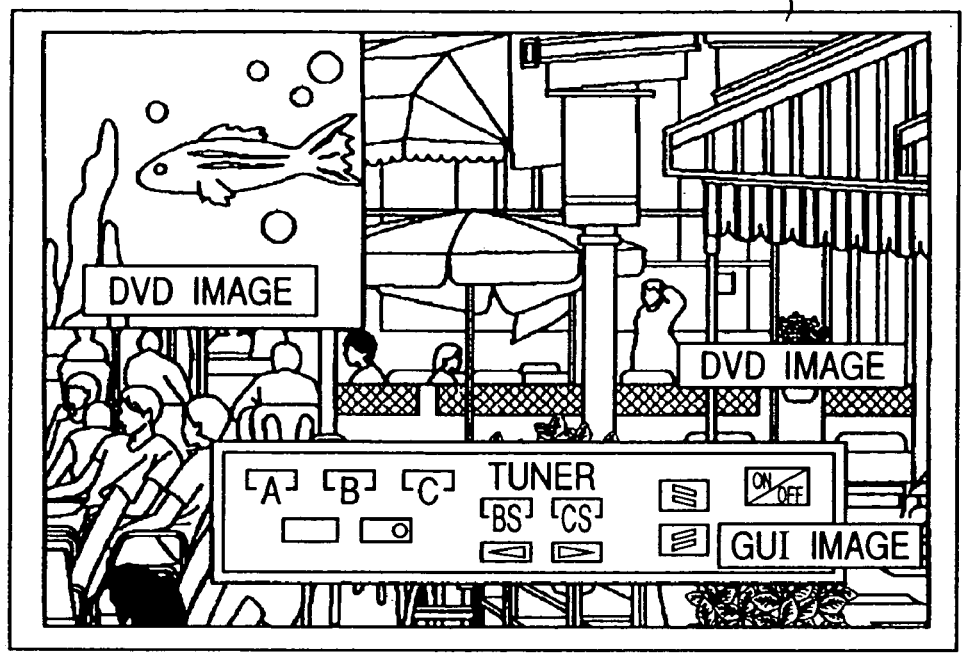
FIG. 6 is a diagram illustrating a composition (chroma key composition) result for a multi-picture and a GUI picture in the initializing process shown in FIG. 3.

Step S103:

After the initializing process at Step S102 described above, the multi-picture control unit 10 enables an image display by the display unit 16. The display device 16 therefore displays an image such as shown in FIG. 6 (image after multi-picture composition initialization).

Step S104:

The multi-picture control unit 10 judges from the image on the display device 16 whether a user performs a magnification/reduction action by using the remote controller 23.

Step S105:

If it is judged at Step S104 that the magnification/reduction action was performed, the multi-picture control unit 10 executes a magnification/reduction change process for the display device 16. This process is similar to the processes at Steps S203 to S206 shown in FIG. 3. Thereafter, the flow returns to Step S104 to repetitively execute the Steps to follow.

Step S106:

If it is judged at Step S104 that the magnification/reduction action was not performed, the multi-picture control unit 10 judges from the image on the display device 16 after the initialization whether the user performs a position change action by using the remote controller 23.

Step S107:

If it is judged at Step S106 that the position change action was performed, the multi-picture control unit 10 executes a position change process for the display device 16. This process is similar to the processes at Steps S203 to S205 shown in FIG. 3. Thereafter, the flow returns to Step S106 to repetitively execute the Steps to follow.

Step S108:

If it is judged at Step S106 that the position change action was not performed, the multi-picture control unit 10 judges from the image on the display device 16 after the initialization whether the user performs a multi-picture display correction action by using the remote controller 23.

Step S109:

If it is judged at Step S108 that the multi-picture display correction action was performed, the multi-picture control unit 10 executes a multi-picture display correction process for the display device 16. Thereafter, the flow returns to Step S108 to repetitively execute the Steps to follow.

Step S110:

If it is judged at Step S108 that the multi-picture display correction action was not performed, the multi-picture control unit 10 judges whether the power of the system 100 was turned off. If not, the flow returns to Step S104 to repetitively repeat the Steps to follow, whereas if the power was turned off, the process is terminated.

Chroma Key Composition Process for Multi-Picture and GUI Picture by Image Display System 100

Next, a process of composing a picture of two images (multi-picture) and a picture of a GUI image (GUI picture) according to the embodiment will be described.

Figure 7:
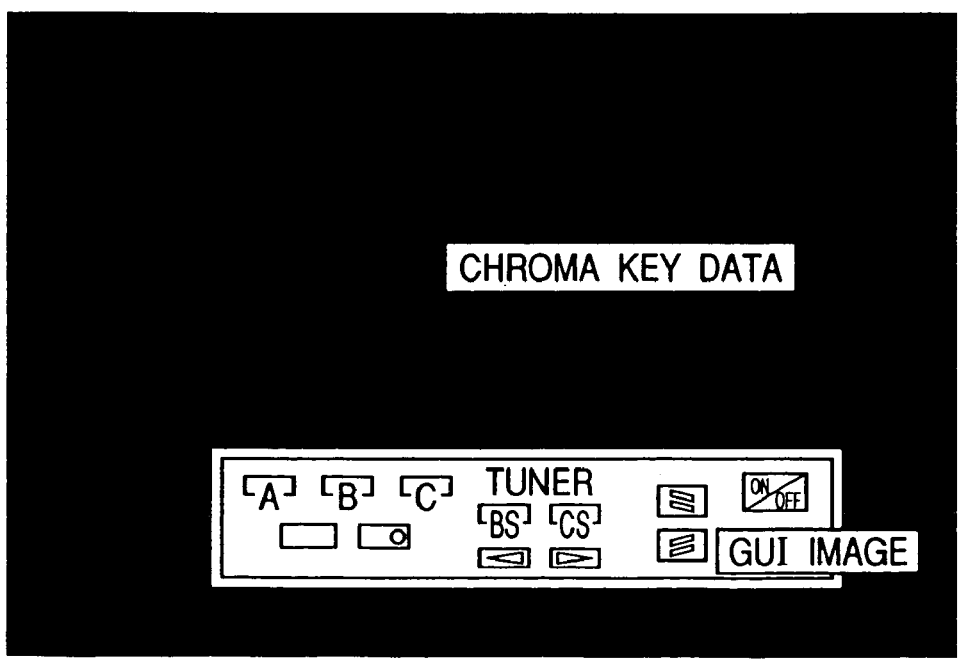
FIG. 7 is a diagram showing a chroma key pattern on a GUI picture during chroma key composition.

In this embodiment, a chroma key composition method is used as a method of composing a multi-picture and a GUI picture. In this embodiment, when the graphic accelerator 21 develops a GUI picture in the memory unit 14, a paint-out process with a specific chroma key color is also executed. For example, as shown in FIG. 7, an area outside of the GUI image is painted out with data of a specific chroma key color (chroma key data, hereinafter simply called "key color" in some case).

In this embodiment, the multi-picture control unit 10 determines a color (e.g., magenta) which is rarely used for drawing a GUI image, as the chroma key color. Therefore, GUI image data and key color data are developed in the GUI image area 14c of the memory unit 14 shown in FIG. 4.

In this case, if the data read from the GUI image area 14c of the memory unit 14 contains key color data, the output composition unit 18 shown in FIG. 5 selects a desired multi-picture and composes it in place of an image corresponding to the key color data.

Figure 8:
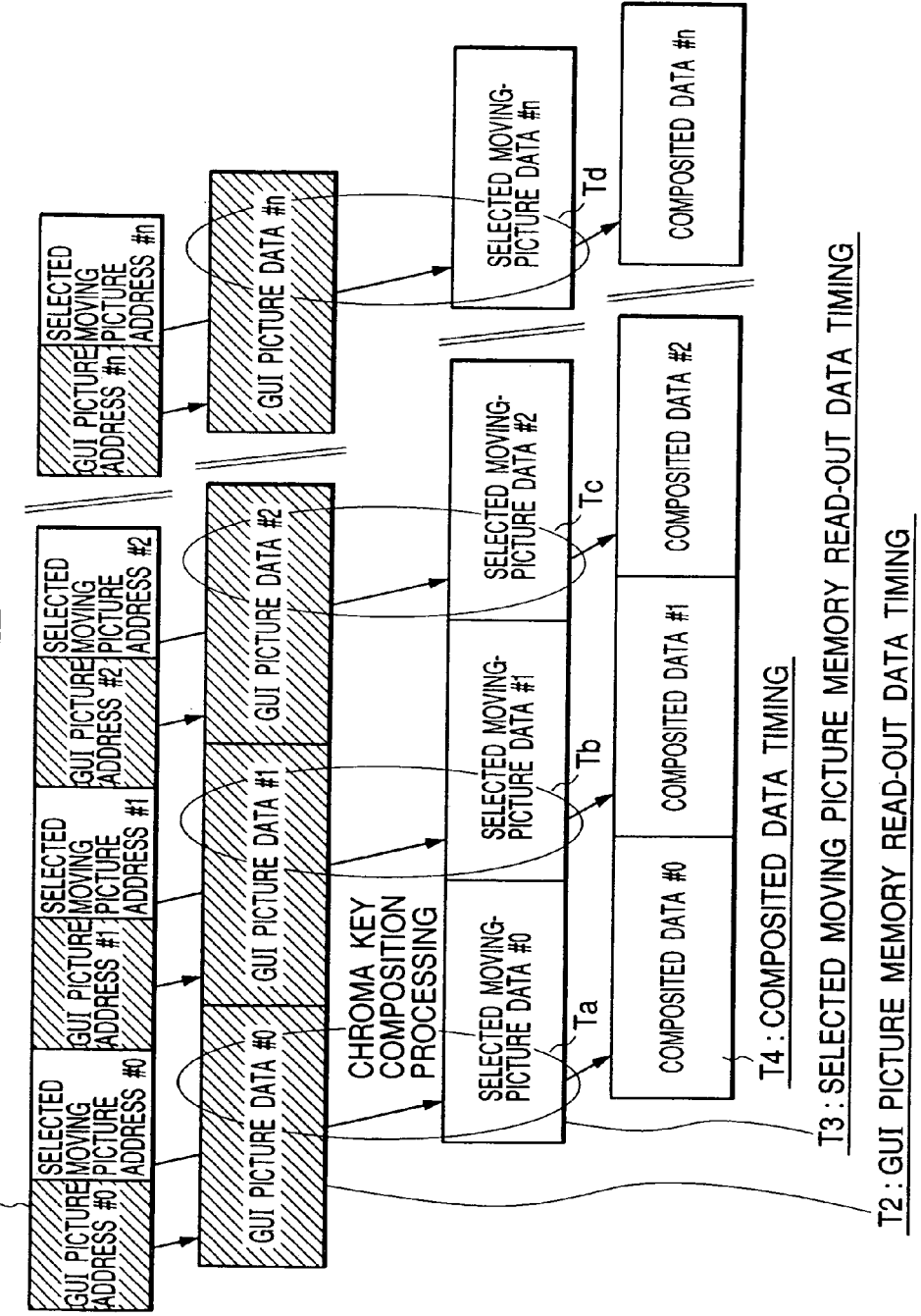
FIG. 8 is a timing chart illustrating chroma key composition.

FIG. 8 is a timing chart of a composition process by the output composition unit 18. In FIG. 8, "T1" represent a timing when a memory address of the memory unit 14 is generated. A cycle of a GUI image address and a next selected moving image address on the same line is repetitively generated and selected by the address generation units 31 to 33 and address selection unit 35 under the control of the composition control unit 30.

The GUI image data read from the memory unit 14 at memory address generation timings "T1" is written in the data buffer 36 at a timing "T2" (read timing of data in the GUI image area 14c of one frame/field).

Similarly, the selected moving image data is written in the data buffer 36 at a timing "T3" (read timing of data in the areas 14a and 14b for two pictures of the moving image). The data buffer 36 has a double buffer structure capable of storing both a GUI image and a selected moving image.

The GUI image data written in the data buffer 36 at the timing "T2" is also input to the composition control unit 30.

The composition control unit 30 sequentially compares the GUI image data with the key color data set to the key color register 39, and if there is a coincidence, a chroma key hit flag is set, and this flag is written in a chroma key flag buffer in the composition control unit 30.

The composition control unit 30 reads the chroma key hit flag in the chroma key flag buffer at timings "Ta" to "Td" (surrounded by a circle in FIG. 8). If the flag contents indicate a chroma key hit, moving image data is read from the data buffer 36, whereas if the flag contents do not indicate a chroma key hit (indicate a chroma key misshit), GUI image data is read from the data buffer 36 in response to the read control signal S9. At a composite data timing "T4", image data (chroma key composite data) composed from moving image data and GUI image data can be generated.

Most Characteristic Feature of Image Display System 100

As described earlier, if data unable to be controlled by CPU is developed in a GUI image, a probability of a key color hit increases and an intended image composition may not be performed. Data unable to be controlled by CPU includes still image data derived from BS digital data broadcast, image data on the Internet, natural image data taken by a digital camera or the like. In order to solve this, according to the embodiment, a GUI image drawing development is controlled as in the following when data broadcast is received at a digital television.

Figure 9:
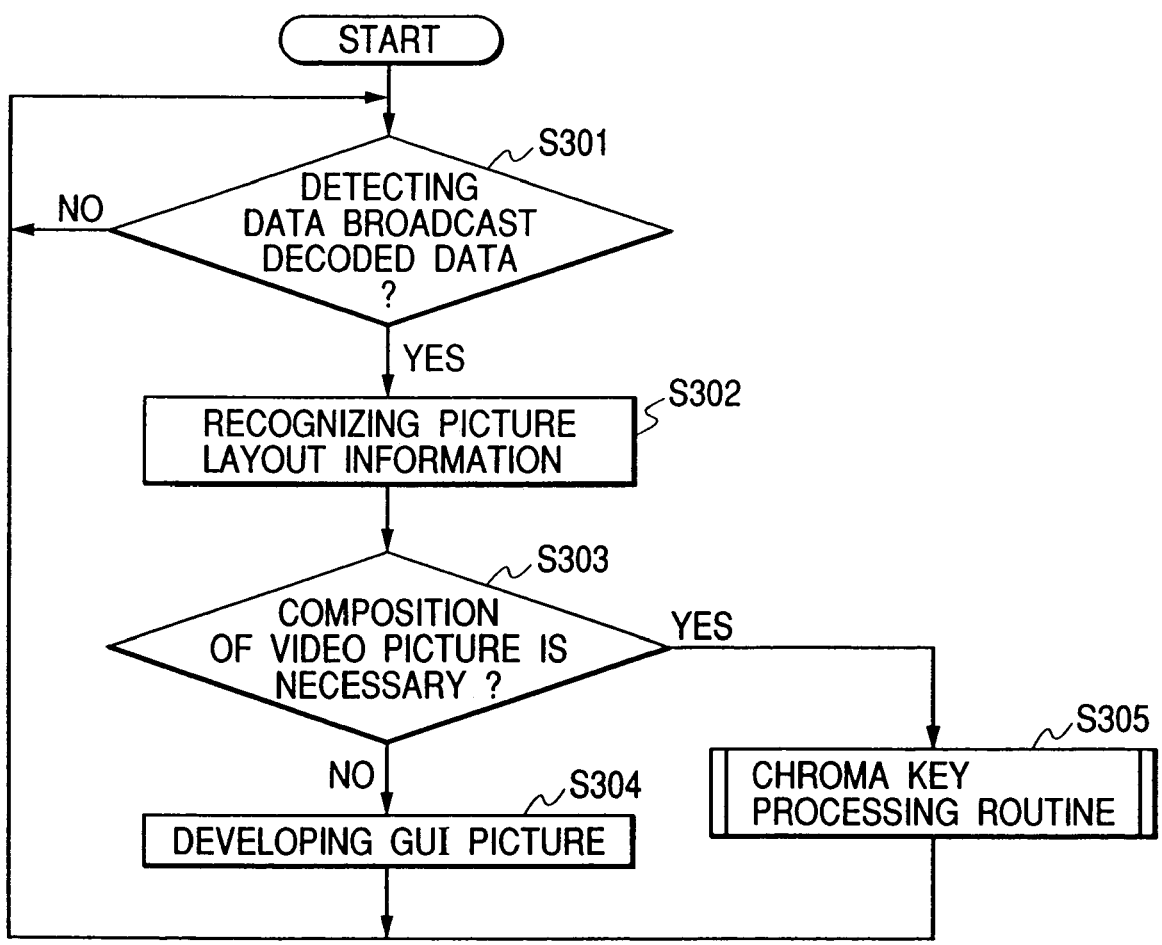
FIG. 9 is a flow chart illustrating a GUI picture drawing process to be executed by the image display system shown in FIG. 1 during data broadcast reception.

FIG. 9 is a flow chart illustrating a GUI image drawing development process to be executed during reception of digital television data broadcast.

Step S301:

The multi-picture control unit 10 detects addition information decoded by the data decoding unit 7 (addition information after data broadcast decoding). If the addition information is not detected at Step S301, the flow stands by until the addition information is detected.

Step S302:

If the addition information is detected at Step S301, the multi-picture control unit 10 recognizes the picture layout information from the contents of the addition information. As described earlier, the data decoding unit 7 derives a scenario of a multimedia information service provider from an object described by a scenario descriptive language, such as MHEG-5, HTML and XML, the scenario being constituted of structural attributes (size, position, image type, coding method) of contents. The multi-picture control unit 10 analyzes this scenario to recognize the picture layout information.

Step S303:

The multi-picture control unit 10 judges from the picture layout information recognized at Step S302 whether or not it is necessary to compose a GUI picture and a multi-picture.

Step S304:

If it is judged at Step S303 that composition is unnecessary, then in accordance with the picture layout information recognized at Step S302, the multi-picture control unit 10 issues a drawing command to the graphic accelerator 21 to develop a GUI picture in the memory unit 14.

Figure 10:
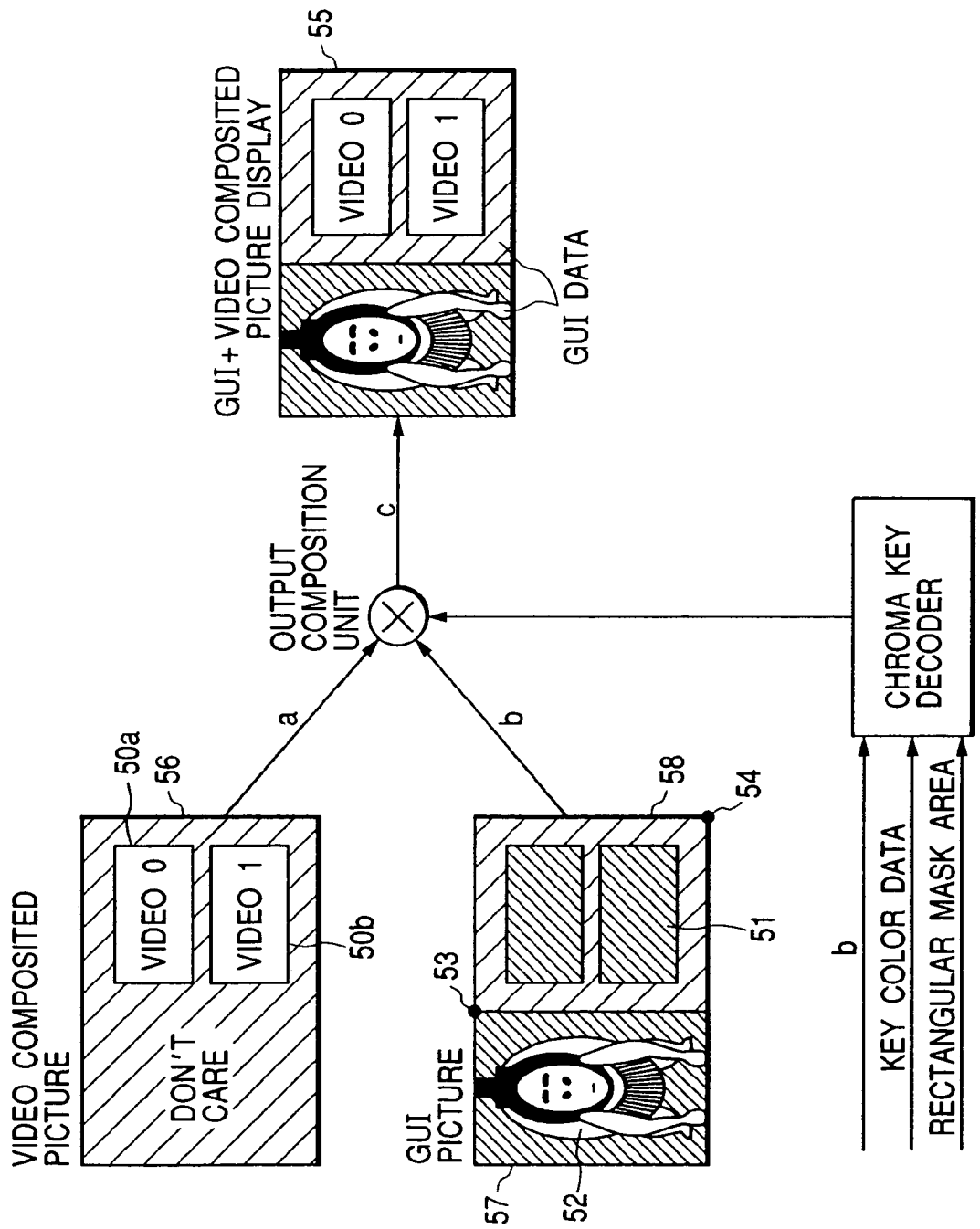
FIG. 10 is a diagram illustrating a chroma key process in the GUI picture drawing process.

Step S305:

If it is judged at Step S303 that composition is necessary, the multi-picture control unit 10 executes the chroma key process to be described later. For example, the composition becomes necessary when a composite picture 55 such as shown in FIG. 10 is displayed, the composite picture 55 including a GUI picture supplied from a multimedia information provider during data broadcast and a multi-picture of BS digital broadcast.

Figure 11:
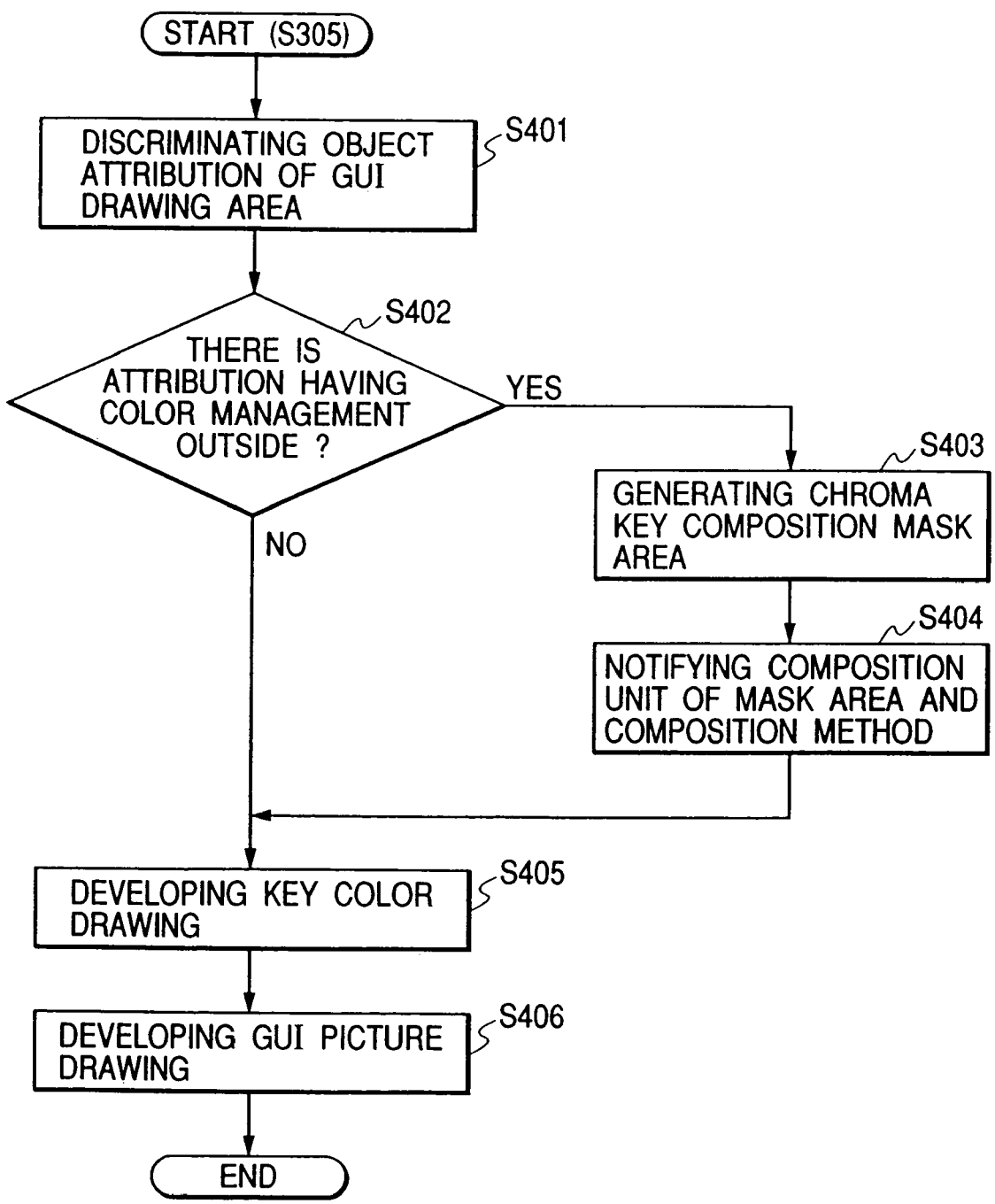
FIG. 11 is a flow chart illustrating the chroma key process.

FIG. 11 is a flow chart illustrating the chroma key process at Step S305.

Step S401:

In accordance with the addition information supplied from the data decoding unit 7, the multi-picture control unit 10 identifies object attributes of a GUI image to be developed on the GUI image area 14c of one picture of the memory unit 14. The object attributes include the display position coordinate values (start and end points), text information, color management information, source attributes of moving/still images, and the like, respectively of each object constituting a GUI picture.

Step S402:

The multi-picture control unit 10 judges whether or not the attribute of all the object data identified at Step S401 has colors capable of being controlled, i.e., has no colors unable to be controlled.

Step S405:

If it is judged at Step S402 that the attributes have no colors unable to be controlled, as shown in FIG. 10 the multi-picture control unit 10 develops the key color 51 in an area of the GUI picture 57 corresponding to the video areas 50a and 50b (where two moving images video 0 and video 1 are displayed in the multi-picture (composite video picture) 56, in order to superpose the multi-picture in the GUI picture.

Step S406:

The multi-picture control unit 10 then develops the GUI picture drawing.

Step S403:

If it is judged at Step S402 that the attribute has a color unable to be controlled by CPU (the attribute has colors capable of being controlled by CPU), then a key color is hit. For example, as shown in FIG. 10, if the GUI picture 57 contains object data 52 having colors unable to be controlled such as a natural picture, then a key color is hit in this area (natural picture area) containing the object data. In this case, in order to avoid a chroma key composition miss, the multi-picture control unit 10 sets a chroma key composition process area (rectangular mask area). More specifically, as shown in FIG. 10, a rectangular area 58 defined by start and end points 53 and 54 outside of the area for which the chroma key composition process can be performed without any problem, i.e., outside of the natural picture area, is set as the rectangular mask area.

Step S404:

The multi-picture control unit 10 notifies the coordinate values of the start and end points 53 and 54 of the rectangular mask area 58 set at Step S403 and a chroma key composition method (e.g., a method of chroma key composing the rectangular mask area 58), to the output composition unit 18 by using the signal S3.

The natural picture area may be defined as a rectangular area, and an area outside of this rectangular area may be notified to the output composition unit 18 to be used as the area for which the chroma key composition process is executed.

After a notice is given to the output composition unit 18 at Step S404, the processes at Steps S405 and S406 are executed. In this case, in the process of developing the GUI picture drawing at Step S406, the natural image area is developed on the memory unit mainly by using DMA.

Upon reception of the notice of the rectangular mask area from the multi-picture control unit 10 at Step S404, the output composition unit 18 performs chroma key decoding only in the rectangular mask area designated by the composition control unit 30. Namely, key color data is detected from the data read from the memory area 14c only in the rectangular mask area, and if a key color bit is detected, a chroma key hit flag is set.

As above, if chroma key composition is required during reception of a digital television data broadcast, an object in the addition information of data broadcast to be composed as a GUI picture is recognized. If it is judged that there is an object whose color cannot be controlled by the multi-picture control unit 10, an area outside of the area containing such an object is set as the rectangular mask area for the chroma key composition process so that a chroma key composition miss can be avoided.

In the first embodiment, although one rectangular mask area is set for the chroma key composition, there is a case which requires two or more rectangular mask areas. In the second embodiment, a chroma key composition process to be used for such a case will be described.

Figure 12:
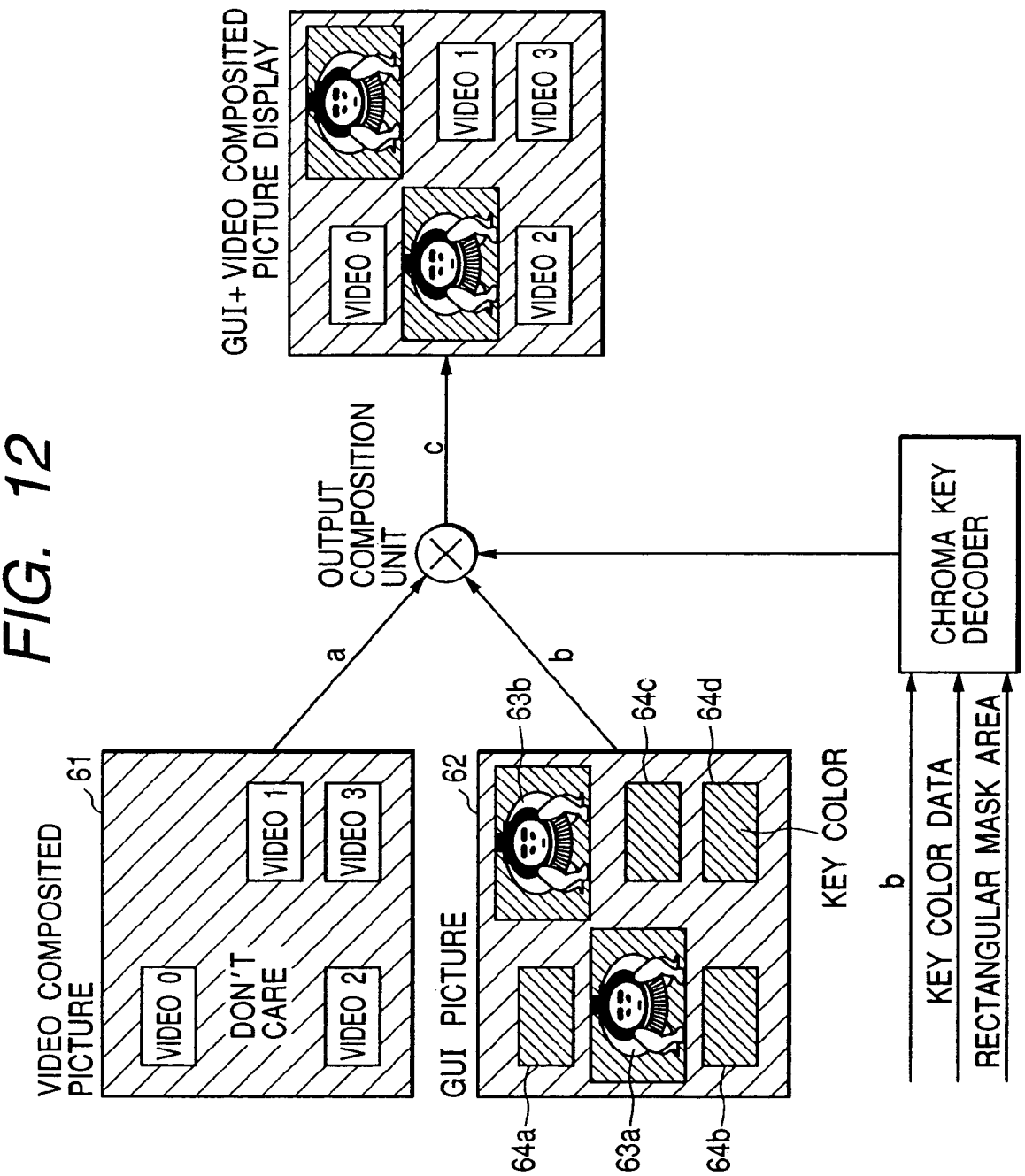
FIG. 12 is a diagram illustrating a chroma key process which requires optimization of a rectangular mask area according to a second embodiment.

In this embodiment, for example, as shown in FIG. 12, chroma key composition is performed for a multi-picture 61 made of images (video 0 to video 3) input from four image sources and a GUI picture 62 having two natural picture areas 63a and 63b.

Figure 13:
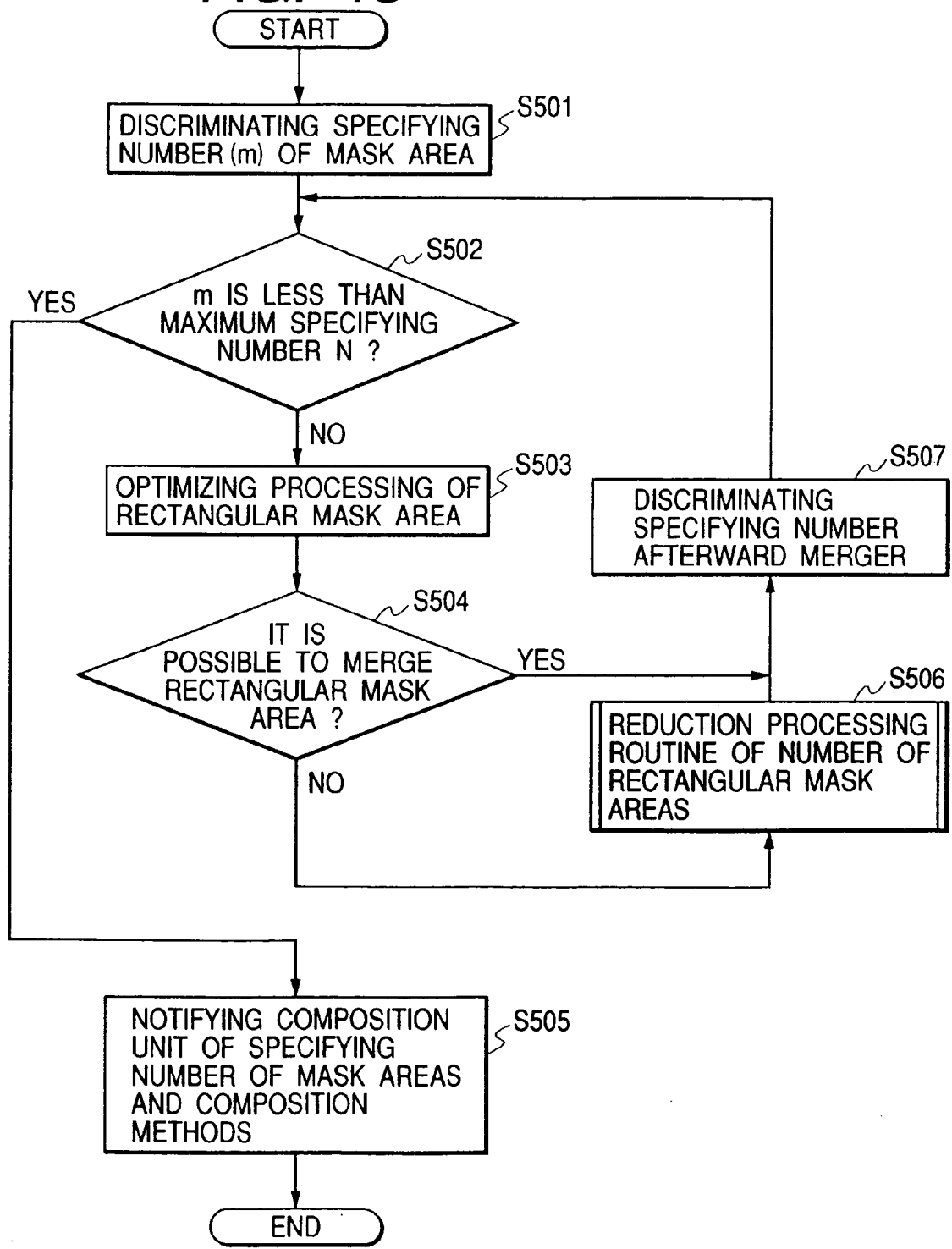
FIG. 13 is a flow chart illustrating the chroma key process shown in FIG. 12.

This chroma key composition process is performed, for example, in accordance with the flow chart shown in FIG. 13.

Step S501:

The multi-picture control unit 10 specifies the number (m) of rectangular mask areas.

Figure 14:
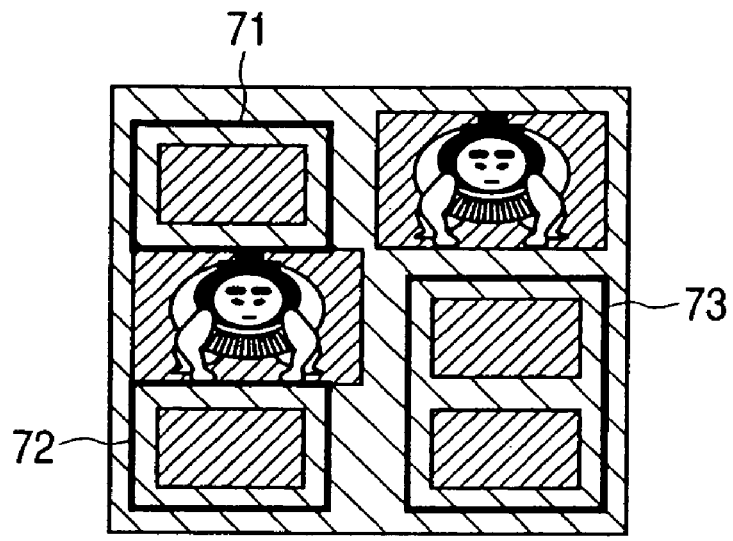
FIG. 14 is a diagram showing rectangular areas before optimization.

Fog example, as shown in FIG. 12, four areas 64a to 64c corresponding to the areas of video 0 to video 3 in a multi-picture area 61 are grouped, as shown in FIG. 14, into three areas including an area 71 corresponding to the area 64a, an area 72 corresponding to the area 64b, and an area 73 corresponding to the areas 64c and 64d. This state means that the chroma key composition process is performed only for these three areas (rectangular areas) 71 to 73, i.e., these rectangular areas 71 to 73 are used as the rectangular mask areas. In this example, the number (m) of rectangular areas specified at this Step S501 is "3".

Step S502:

The multi-picture control unit 10 judges whether the specified number (m) judged at Step S501 is equal to or smaller than a maximum specifying number N of rectangular areas supported by the system 100. It is assumed herein that the maximum specifying number N of rectangular areas is "2". The maximum specifying number N of rectangular areas can be increased in correspondence with an increased number of horizontal/vertical counters for a rectangular area. It is, however, preferable to set the number N to about 1 or 2 from the viewpoint of cost.

Step S503:

If it is judged at Step S502 that the specified number (m) is larger than the maximum specifying number N of rectangular areas, the multi-picture control unit 10 performs an optimization process for rectangular mask areas.

Figure 15:
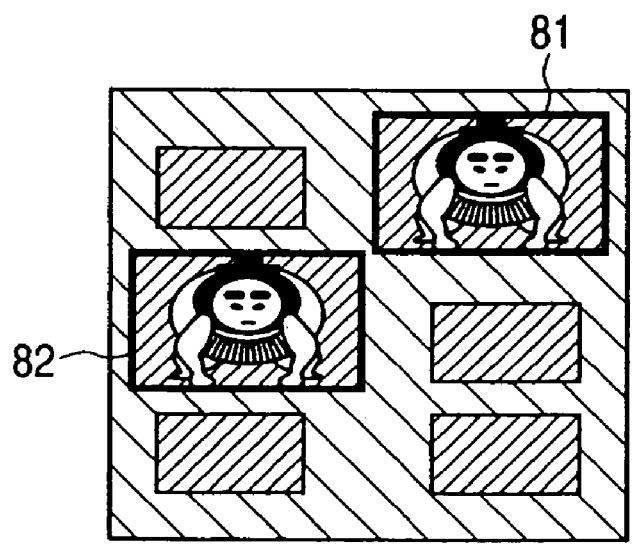
FIG. 15 is a diagram showing rectangular areas after optimization.

More specifically, the multi-picture control unit 10 reconsiders the rectangular mask areas 71 to 73 shown in FIG. 14 so as not to make the specified number (m) larger than the maximum specifying number N of rectangular areas. For example, as shown in FIG. 15, an area outside of the two rectangular areas 81 and 82 corresponding to the natural image areas 63a and 63b (containing objects whose color is unable to be controlled by the multi-picture control unit 10) is defined as the rectangular mask area for the chroma key composition. In this manner, the specified number (m) can be optimized so as not to exceed the maximum specifying number N.

Step S504:

The multi-picture control unit 10 checks whether rectangular mask areas after the optimization process at Step S503 can be merged.

Step S507:

If it is judged at Step S504 that the rectangular mask areas can be merged, the multi-picture control unit 10 checks the specified number (m) after merger. In this example, the specified number (m) is "2". Thereafter, the flow returns to Step S502 to repetitively perform the Steps to follow.

If it is judged at Step S504 that the rectangular mask areas cannot be merged, a process (rectangular mask area number reduction process) is executed at Step S506 to thereafter advance to the Step S507. The details of the process (rectangular mask area number reduction process) at Step S506 will be given later.

Step S505:

If it is judged at Step S502 that the specified number (m) is not larger than the maximum specifying number N of rectangular areas, the multi-picture control unit 10 notifies, as described earlier, the output composition unit 18 of the coordinate values of the start and end points of the rectangular mask areas for the chroma key composition and a chroma key composition method (e.g., a method of chroma key composing the area other than the natural picture areas), as well as the specified number (m).

As described above, in accordance with the picture layout and the maximum specifying number N of rectangular mask areas, the system 100 optimizes the specified number (m) of rectangular mask areas. It is therefore possible to provide a highly flexible and low cost apparatus or system capable of composing a multi-picture and a GUI picture.

In the third embodiment, the process (rectangular mask area number reduction process) at Step S506 is executed in the following manner. This process is executed under the condition that although it is judged at Step S504 that the rectangular mask areas cannot be merged, it is judged that only the optimization of rectangular mask areas cannot set the specified number (m) lower than the maximum specifying number N.

Figure 16:
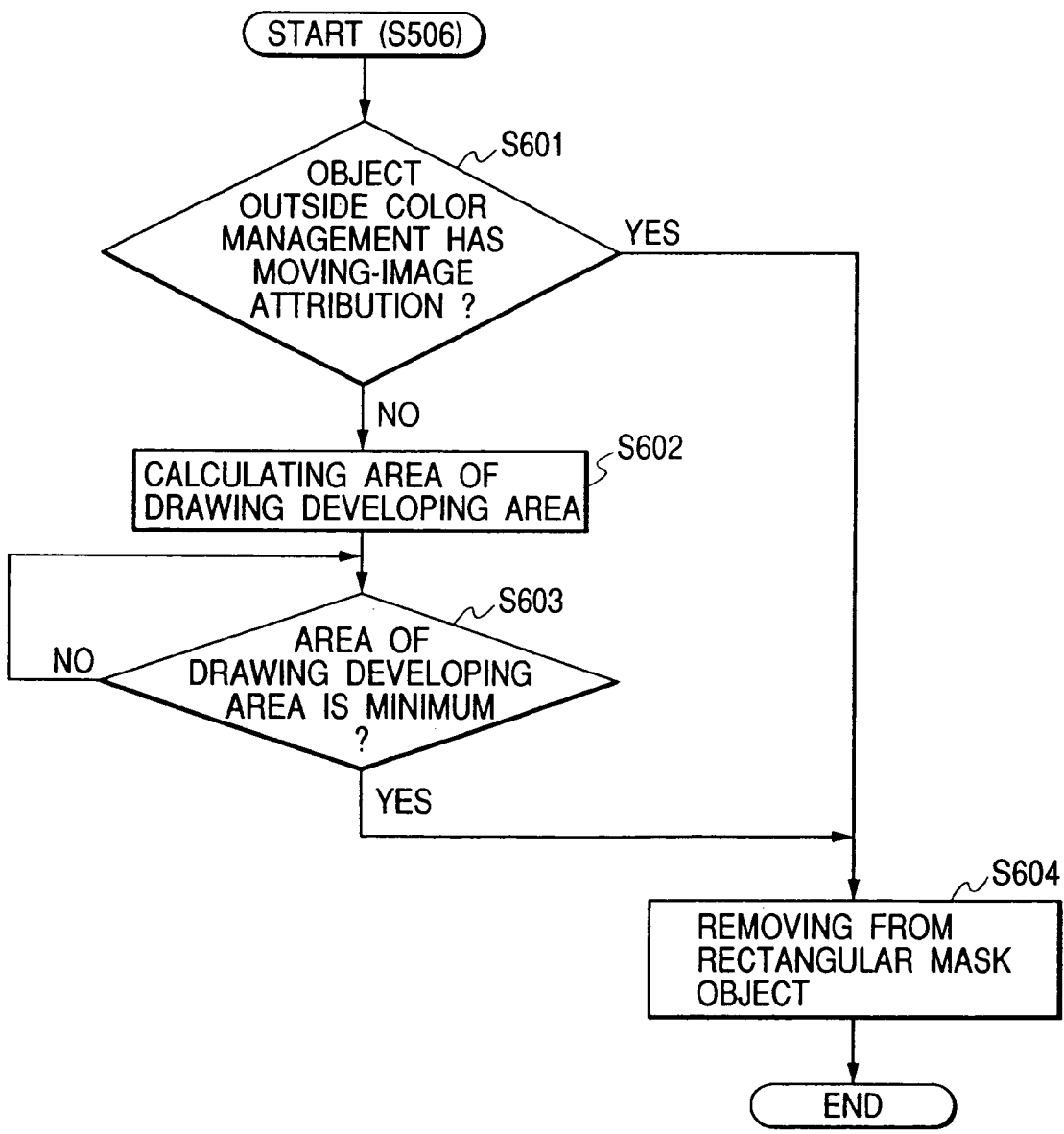
FIG. 16 is a flow chart illustrating a process of reducing the number of rectangular areas in the chroma key process according to a third embodiment of the invention.

FIG. 16 is a flow chart illustrating the rectangular mask area number reduction process.

Step S601:

The multi-picture control unit 10 judges whether an object (such as a natural picture) with uncontrollable color to be developed in each rectangular mask area optimized at Step S503 has a moving image attribute.

Step S604:

If it is judged at Step S601 that the object has a moving image attribute, the multi-picture control unit 10 determines the rectangular mask area with the moving image attribute as an area for the chroma key composition. Generally, display defects to be caused by a chroma key composition miss are not more conspicuous in a moving image than in a still image. In this embodiment, therefore, an object with a moving image attribute is subjected to a chroma key composition process. The flow is terminated thereafter.

Step S602:

If it is judged at Step S601 that the object has no moving image attribute, i.e., if the object is a still image, the multi-picture control unit 10 calculates a drawing developing area of each still image object in the rectangular mask area.

Step S603:

The multi-picture control unit 10 identifies a rectangular mask area having the smallest area calculated at Step S602. The process at Step S604 is performed for the rectangular mask area identified as having a smallest area calculated at Step S602. In this manner, the still image having the smallest area is preferentially subjected to the chroma key composition so that display defects to be caused by a chroma key composition miss can be made not conspicuous as much as possible.

As described above, an object having less display defects to be caused by a chroma key composition miss is not designated as the rectangular mask area to reduce and optimize the specified number (m). It is therefore possible to provide a highly flexible and low cost apparatus or system capable of composing a multi-picture and a GUI picture.

In the above-described embodiments, a multi-picture and a GUI picture are composed which are generated from image data supplied from a plurality of image sources. The invention is not limited only to such a case, but it is also applicable to the case wherein in a system for composing a sub-picture and a main-picture generated by image data supplied from an image source, the sub-picture contains color unable to be controlled by a CPU for controlling a chroma key process.

The objects of the invention may be achieved by supplying a storage medium storing software program codes realizing the function of a host or terminal of each of the first to third embodiments to a system or an apparatus, and reading and executing the program codes stored in the storage medium by a computer (CPU or MPU) of the apparatus or system.

In this case, the software program codes themselves read from the storage medium realize the function of each of the first to third embodiments. Therefore, the storage medium storing program codes constitutes the present invention.

The storage medium for storing such program codes may be a ROM, a floppy disk, a hard disk, an optical disk, a magneto optical disk, a CD-ROM, a CD-R, a magnetic tape, a nonvolatile memory card, or the like.

The scope of the invention also includes not only the case wherein the function of each of the first to third embodiments can be realized by executing read program codes by a computer but also the case wherein the function of each of the first to third embodiments can be realized by executing a portion or a whole of actual processes in accordance with the program codes by an OS or the like running on a computer.

The scope of the invention also includes the case wherein the function of each of the first to third embodiments can be realized by writing the program codes read from a storage medium into a memory of a function expansion board inserted into a computer or of a function expansion unit connected to the computer, and thereafter by executing a portion or the whole of actual processes in accordance with the program codes by a CPU of the function expansion board or function expansion unit.

As described so far, according to each embodiment of the invention, when an image having color unable to be controlled by a graphic accelerator controller (GUI picture control unit such as CPU) is developed in a display memory and if the image has a high probability of a key color hit during a chroma key composition process, the chroma key composition process for the image area can be masked. It is therefore possible to reduce the capacity of a memory used for composing a multi-picture and a GUI picture and to improve a precision of a chroma key composition process.

An apparatus or system can be provided which is suitable for properly balancing a tradeoff between contradictory matters of improved versatility of digital home appliances and cost reduction thereof.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for composing image data of a main picture and image data of a sub-picture by a chroma key process, comprising:

attribute detecting means for detecting an attribute of an image contained in the sub-picture;

area setting means for setting a partial area of the sub-picture as a chroma key mask area in accordance with an output from said attribute detecting means; and composing means for composing the image data of the main picture and the image data of the sub-picture by executing the chroma key process for an area other than the chroma key mask area without executing the chroma key process for the chroma key mask area in the sub-picture, wherein said attribute detecting means detects an attribute of an image contained in the sub-picture in accordance with addition information added to the image data of the sub-picture, and wherein the addition information includes information of a natural picture attribute described in a tag of a multimedia descriptive language.

2. An apparatus for composing image data of a main picture and image data of a sub-picture by a chroma key process, comprising:

attribute detecting means for detecting an attribute of an image contained in the sub-picture;

area setting means for setting a partial area of the sub-picture as a chroma key mask area in accordance with an output from said attribute detecting means; and composing means for composing the image data of the main picture and the image data of the sub-picture by executing the chroma key process for an area other than the chroma key mask area without executing the chroma key process for the chroma key mask area in the sub-picture, wherein said area setting means sets a plurality of chroma key mask areas spaced apart from each other, and said composing means executes the chroma key process for an area other than the plurality of chroma key mask areas.

3. An apparatus according to claim 2, wherein said area setting means further excludes an area corresponding to a predetermined image from the chroma key mask areas, if the plurality of set chroma key mask areas exceeds a predetermined number.

4. An apparatus according to claim 3, wherein the predetermined image is a moving image.

5. An image processing apparatus, comprising:

receiving means for receiving a television broadcast signal multiplexing image data and addition information data;

main-picture generating means for generating a main-picture in accordance with the image data;

sub-picture generating means for generating a sub-picture in accordance with the addition information data;

attribute detecting means for detecting an attribute of an image contained in the sub-picture in accordance with the addition information data;

area setting means for setting a partial area of the sub-picture as a chroma key mask area in accordance with an output from said attribute detecting means; and composing means for composing the image data of the main picture and the image data of the sub-picture by executing the chroma key process for an area other than the chroma key mask area without executing the chroma key process for the chroma key mask area in the sub-picture, wherein said attribute detecting means detects an image contained in the sub-picture having a predetermined attribute, and said area setting means sets an area of an image having the predetermined attribute as the chroma key mask area, and wherein the addition information is described by a scenario descriptive language, and said sub-picture generating means generates the sub-picture by analyzing a scenario described in the addition information.

6. An image processing apparatus, comprising:

receiving means for receiving a television broadcast signal multiplexing image data and addition information data;

main-picture generating means for generating a main-picture in accordance with the image data;

sub-picture generating means for generating a sub-picture in accordance with the addition information data;

attribute detecting means for detecting an attribute of an image contained in the sub-picture in accordance with the addition information data;

area setting means for setting a partial area of the sub-picture as a chroma key mask area in accordance with an output from said attribute detecting means; and composing means for composing the image data of the main picture and the image data of the sub-picture by executing the chroma key process for an area other than the chroma key mask area without executing the chroma key process for the chroma key mask area in the sub-picture, wherein said area setting means sets a plurality of chroma key mask areas spaced away from each other, and said composing means executes the chroma key process for an area other than the plurality of chroma key mask areas.

7. An apparatus according to claim 6, wherein said area setting means further excludes an area corresponding to a predetermined image from the chroma key mask areas, if the plurality of set chroma key mask areas exceeds a predetermined number.

* * * * *

UNITED STATES PATENT AND TRADEMARK OFFICE
CERTIFICATE OF CORRECTION

PATENT NO. : 6,961,097 B2  
DATED : November 1, 2005  
INVENTOR(S) : Hideaki Yui It is certified that error appears in the above-identified patent and that said Letters Patent is hereby corrected as shown below:

Column 1,  
Line 21, "displaying" should read -- display --.  
Line 64, "the data" should read -- data- --.

Column 3,  
Line 53, "listened." should read -- listened to. --.

Column 4,  
Line 42, "am" should read -- an --.

Column 7,  
Line 34, "operate-using" should read -- operate using --.

Column 9,  
Line 14, "case)." should read -- cases). --.

Column 12,  
Line 7, "64c" should read -- 64d --.

Signed and Sealed this

Twenty-fifth Day of April, 2006

JON W. DUDAS  
*Director of the United States Patent and Trademark Office*